US006262870B1

(12) United States Patent
Yumoto

(10) Patent No.: US 6,262,870 B1
(45) Date of Patent: Jul. 17, 2001

(54) SUPPRESSION OF ELECTROSTATIC INTERFERENCE FROM A TRANSFORMER WITH A SHORT RING

(75) Inventor: Hideki Yumoto, Chula Vista, CA (US)

(73) Assignee: Matsushita Electric Corporation of America, Secaucus, NJ (US)

(*) Notice: Subject to any disclaimer, the term of this patent is extended or adjusted under 35 U.S.C. 154(b) by 0 days.

(21) Appl. No.: 09/000,737

(22) Filed: Dec. 30, 1997

(51) Int. Cl.[7] ........................................ H02H 7/00

(52) U.S. Cl. ........................ 361/38; 361/56; 361/111

(58) Field of Search ..................... 361/56, 111, 113, 361/38, 39, 40, 42, 115

(56) References Cited

U.S. PATENT DOCUMENTS

| | | | |
|---|---|---|---|
| 4,475,097 | 10/1984 | Kikuchi | 336/192 |
| 4,540,967 | 9/1985 | Chitose | 336/84 |
| 5,150,046 | 9/1992 | Lim | 323/356 |
| 5,248,938 | 9/1993 | Kobayashi et al. | 324/207.16 |
| 5,548,254 | 8/1996 | Ueno et al. | 333/25 |
| 5,684,446 | 11/1997 | Adkins et al. | 336/92 |

*Primary Examiner*—Stephen W. Jackson
(74) *Attorney, Agent, or Firm*—Gray Cary Ware Freidenrich

(57) ABSTRACT

A multi-winding transformer with a short ring includes an electrically conductive discharge path connected to the short ring for discharging the short ring and/or the transformer. Discharging the short ring suppresses or eliminates electrostatic interference caused by the structure and operation of the transformer.

47 Claims, 4 Drawing Sheets

SUPPRESSION OF ELECTROSTATIC INTERFERENCE FROM A TRANSFORMER WITH A SHORT RING

BACKGROUND OF THE INVENTION

The invention relates to a transformer shielded with a short ring, and more particularly to suppression of electrostatic interference from a transformer with a short ring by electrical connection of the short ring to a predetermined potential through a discharge path.

When a transformer is used in an electronic circuit or system, it is known to reduce or eliminate leakage flux from the transformer by use of a short ring. In this regard, a short ring is a closed, annular ring of electrically conductive material (or soft magnetic material) that girds the transformer, on the outside of the transformer's windings and core. The purpose of the short ring is to shield nearby components from magnetic flux that leaks from the transformer's windings and core. For example, in a color television (CTV) system, use of a short ring in a switching power supply can reduce or eliminate 60 Hz "hum" from the audio and video portions of TV programming.

While a short ring can effectively suppress or eliminate electromagnetic interference, its structure and operation, and/or the structure and operation of a transformer shielded by the short ring, can produce an electrical potential that may capacitatively discharge to adjacent components, causing electrostatic disruption of the components.

SUMMARY OF THE INVENTION

The problem is solved by the inventor's critical realization that the charge induced in at least one short ring of a multi-winding transformer can be safely and effectively discharged by provision of an electrically conductive discharge path from the short ring to a predetermined potential. Preferably, the predetermined potential is a ground to which one side of the transformer is referenced. Alternatively, the predetermined potential may be a drive signal in response to which the transformer operates.

The inventor has further realized that, for a transformer having at least one Faraday shield, as well as at least one short ring, both the Faraday shield and the short ring can be connected through one or more electrical discharge paths to the predetermined potential.

Accordingly, an objective of this invention is to provide to a transformer that has at least one short ring with an electrically conductive discharge path between the at least one short ring and a predetermined potential.

Achievement of this objective provides the unexpected benefit of suppression or elimination of electrostatic and electromagnetic interference caused by the operation of a multi-winding transformer having at least one short ring.

Achievement of these and other objectives and advantages by this invention will be evident when the following detailed description is read with reference to the below-described drawings.

DETAILED DESCRIPTION OF THE PREFERRED EMBODIMENTS

Figure 1:
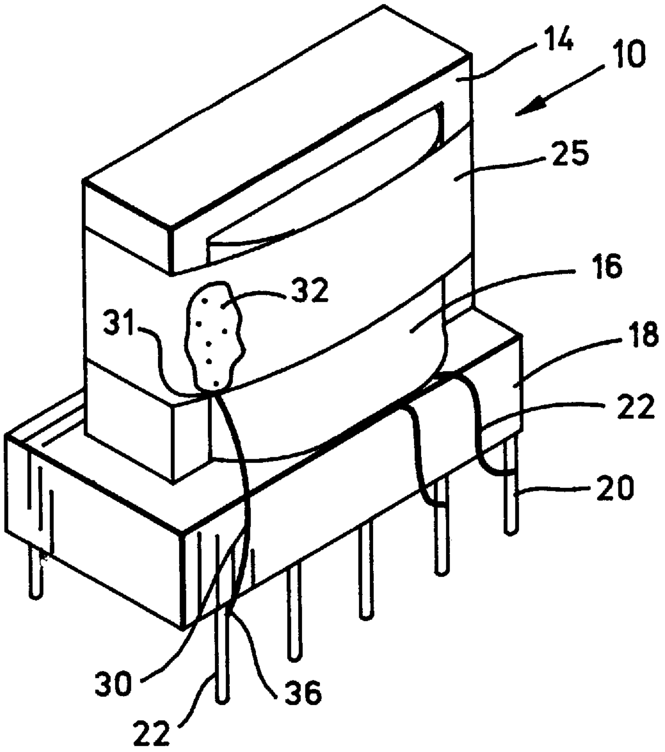
FIG. 1 is a side perspective view of a transformer with a short ring showing an electrically conductive discharge path for the short ring.

Refer now to all of the figures, where like reference numerals indicate identical parts throughout the drawings. In FIG. 1, a transformer 10, having a conventional construction and operating according to known principles, is illustrated. The transformer 10 is of the type used in electronic systems for tasks such as power conversion and/or regulation. The transformer 10 includes a core 14 on which are disposed a plurality of windings 16. The windings 16 are conventionally encased or otherwise contained in an electrically inert material such as an epoxy. The transformer 10 is conventionally mounted on a dual in-line package (DIP) 18 having a plurality of pins such as 20. The configuration of the DIP 18 is conventional and is specifically intended for mounting the transformer 10 in an electronic circuit or system by means of a printed circuit board (PCB) to which the pins 20 are electrically connected by, for example, soldering. The pins 20 are further electrically connected to the windings 16 by means of leads or wires, such as the wire 22. A short ring 25 girds the transformer 10, passing on the outside of the core 14 and the windings 16. Generally, the short ring 25 is an annular ring which may be formed with an electrically conductive (and/or magnetically soft) material, such as copper, that may be mounted on the transformer 10 by conventional means. The material of the short ring 25 may also comprise a conductive screen or a porous conductive material.

The short ring 25, and therethrough the transformer 10, may be electrically discharged by provision of an electrically conductive pathway (also "discharge path" or "discharge pathway"). As an example, the electrically conductive pathway may include a wire 30 with a first end 31 that is soldered at 32 to the short ring 25, and a second end 36 that is soldered to a pin 22 of the DIP 18. The electrically conductive discharge path 32, 31, 30, 36, 22 functions to provide for discharging electrical charge induced on the short ring 25 and/or the transformer 10, thereby to suppress or eliminate electrostatic interference by an electric field caused by the electrical charge on the short ring 25 and/or the transformer 10.

It should be manifest that FIG. 1 is only representative of the invention and is not intended to limit the invention to the embodiment shown. Broadly, the invention provides an electrically conductive discharge path that is electrically connected to a short ring of a transformer. The discharge path can include one or more wires, conductors, filaments, leads, lands, and/or combinations thereof, and/or structural and functional equivalents thereof. Further, the provision of a DIP 18 for mounting the transformer 10 is not necessary to the invention; instead, the transformer 10 may be mounted in an electronic or electrical circuit and/or on a circuit board, chassis, or frame using any conventional means, and the invention may be practiced by providing an electrically conductive discharge path electrically connected to the short ring 25. Further, although one short ring is shown in FIG. 1, this is not intended to limit the invention to transformers with only short ring. Instead, the principle is applicable to a transformer having one or more short rings or, alternatively, at least one short ring. In the case of multiple short rings, each short ring can be provided with its own separate electrically conductive discharge pathway, or two or more short rings may be electrically connected together, with an electrically conductive discharge pathway connected to at least one of the connected-together short rings. Finally, although FIG. 1 illustrates the short ring 25 as completely girding the core 14 and windings 16 of the transformer 10, the invention may be applied to other short ring configurations, including those that would gird only the windings of a transformer.

Figure 2A:
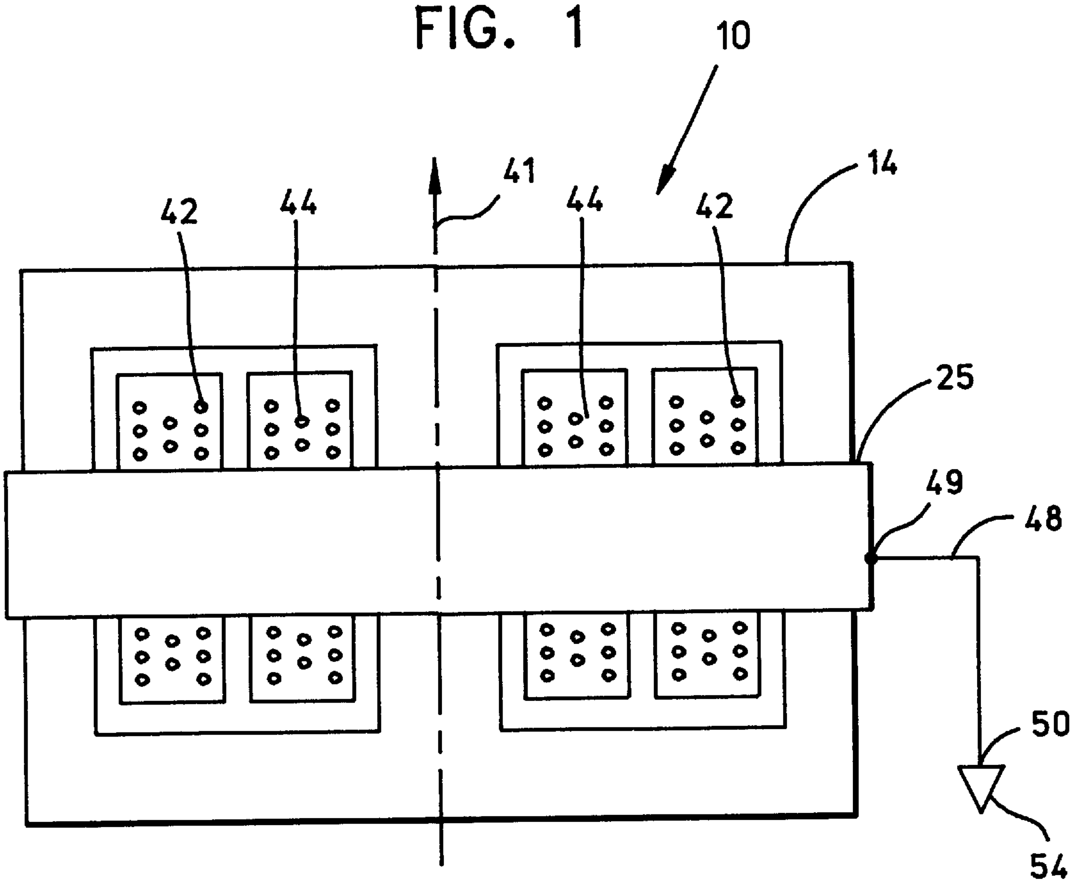
FIG. 2A is a side elevation view of the transformer of FIG. 1, with concentric windings shown in section, that includes a partially schematic representation of the electrically conductive discharge path for a short ring.
Figure 2B:
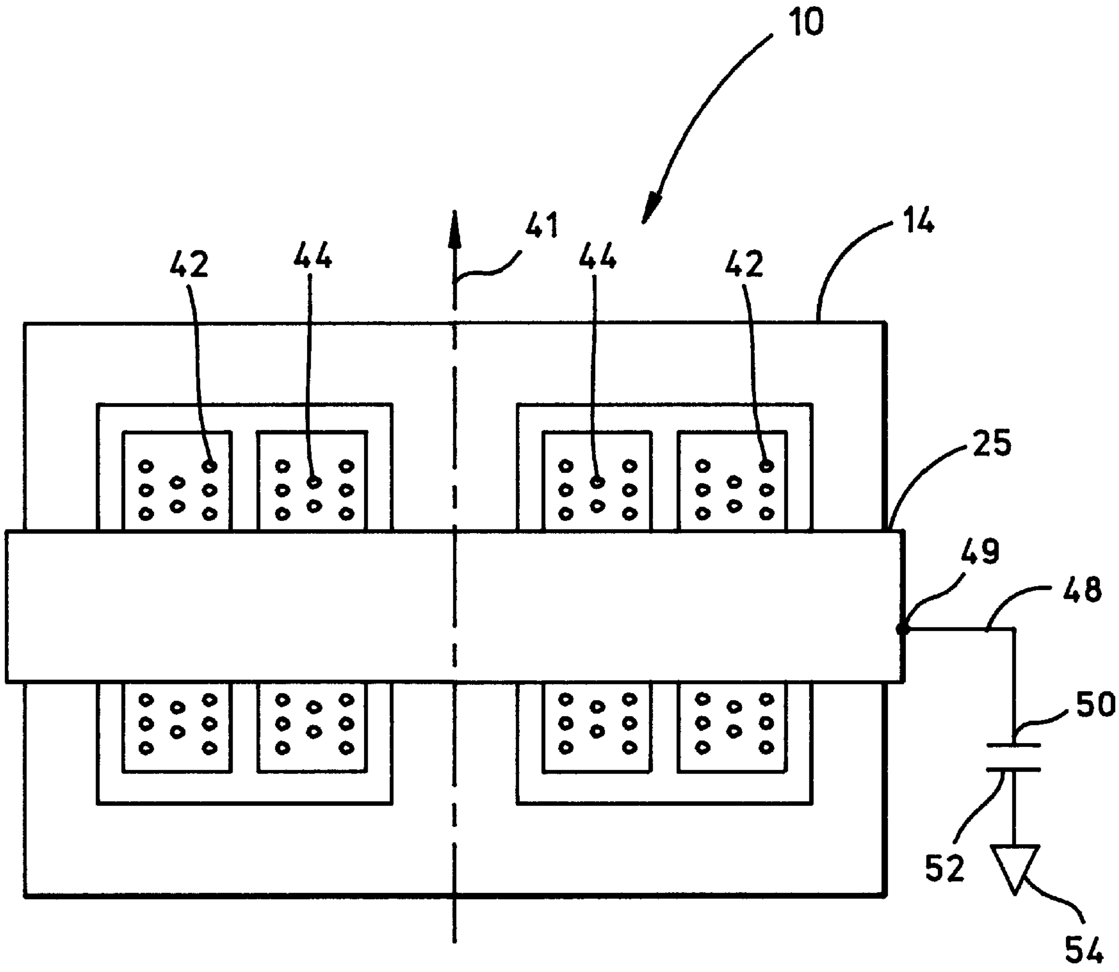
FIG. 2B is a side elevation view of the transformer of FIGS. 1 and 2 that includes a partially schematic representation of an electrically conductive discharge path for a short ring, where the electrically conductive discharge path includes a capacitative element.

FIG. 2A shows the internal structure of the transformer 10 of FIG. 1, with the windings uncovered and shown in section. The transformer 10 includes the core 14, a first set of windings 42, and a second set of windings 44. The windings 42 and 44 are concentrically disposed on the core 14, and are roughly centered on the axis 41. The short ring 25 girds the transformer, also roughly centered on the axis 41, and includes an electrically conductive discharge pathway 48 having a first end 49 electrically connected to the short ring 25 and a second end 50 connected to a predetermined potential 54, such as an AC ground. Preferably, the predetermined potential 54 is referenced to a drive voltage provided to one of the windings of the transformer 10. FIG. 2B shows the invention (with the short ring 25 partially cut away) in another embodiment in which the electrically conductive discharge path from the short ring 25 includes a capacitative element, illustrated by a capacitor 52. In this embodiment, the second end 50 of the electrically conductive discharge pathway 48 is connected to a first plate of the capacitor 52. The second plate of the capacitor 52 is connected to the predetermined potential 54. The capacitor 52 is provided for electrical separation between the potential 54 and another potential. For example, the potential 54 could be a ground to which the drive voltage is referenced, and the capacitor 52 could provide separation between that ground and another ground to which a potential generated by the transformer 10 in response to the drive voltage is referenced.

Figure 3:
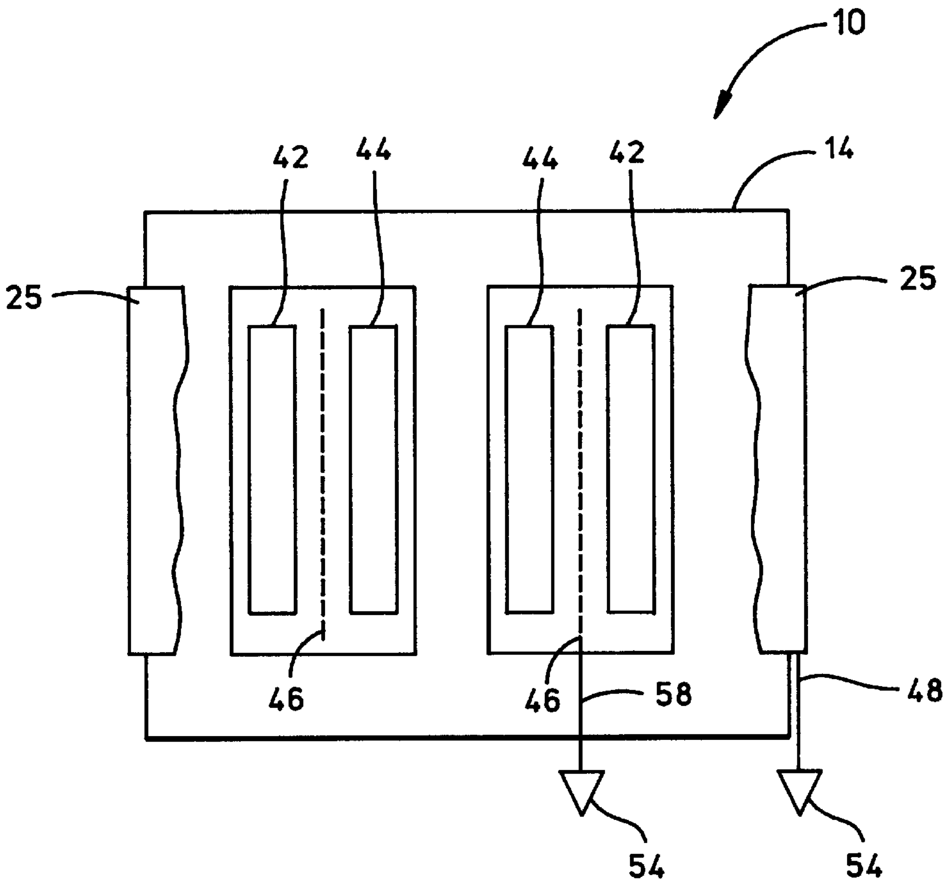
FIG. 3 shows the view of FIGS. 2A and 2B, with the short ring partially broken away, that includes a further schematic representation of an electrically conductive discharge path for a Faraday shield.
Figures 4A, 4B, 4C:
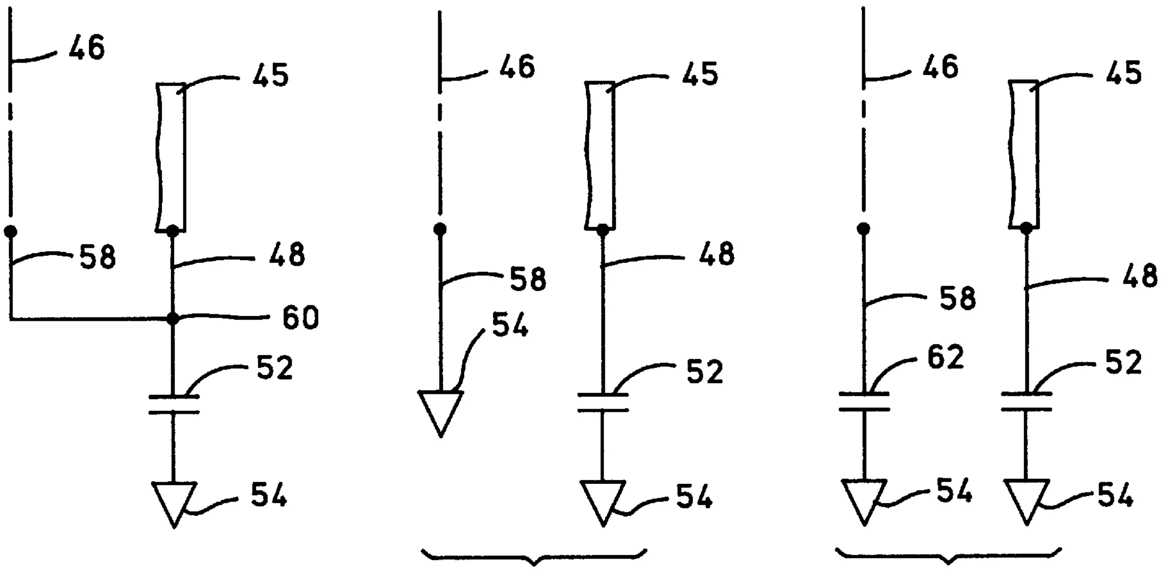
FIGS. 4A–4C illustrate three respective configurations for electrically discharging at east one Faraday shield and at least one short ring according to this invention.

Referring now to FIG. 3, a Faraday shield may be incorporated into the structure of the transformer 10. For example, the transformer 10 includes a Faraday shield 46. As with the short ring 25, induced electric charge on the Faraday shield may also be discharged to reduce electrostatic interference. As is illustrated in FIG. 3, the Faraday shield 46 is provided with an electrically conductive discharge pathway 58 to the potential 54. FIGS. 4A–4C illustrate three other strategies for electrically discharging both the Faraday shield 46 and the short ring 25. In FIG. 4A, the discharge pathways 48 and 58 are electrically connected at 60 and fed through the capacitor 52 to the potential 54. In FIG. 4B, the Faraday shield 46 is connected to the potential 54, through its discharge pathway 58, separately from the short ring 25, which is connected to the potential 54 through capacitor 52. In FIG. 4C, the discharge pathway 58 of the Faraday shield 46 includes a capacitor 62 through which the Faraday shield 46 is discharged to the potential 54; at the same time, the short ring 25 is discharged to the potential 54 through the capacitor 52.

It should be realized that the capacitors 52 and 62 may have conventional two-plate structures or may be embodied in other capacitative elements known to the manufacturers of integrated circuits, electronic components, and electronic systems.

Figure 5:
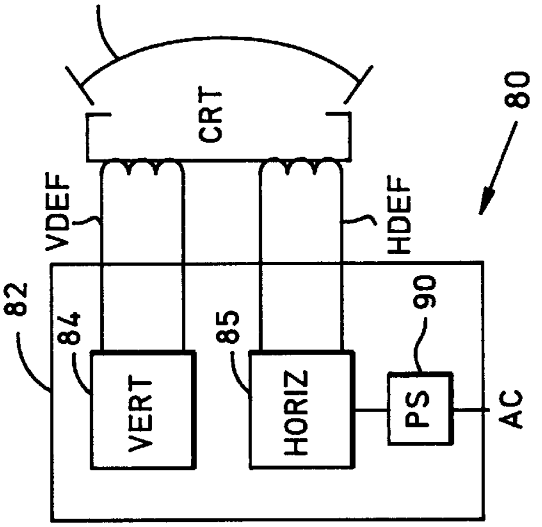
FIG. 5 is a block diagram of a CTV system showing only its vertical and horizontal synch components.

FIG. 5 illustrates a display system 80 in which a main electronic unit 82 including vertical and horizontal synch circuits 84 and 85, respectively, develop vertical and horizontal deflection signals (VDEF and HDEF, respectively) that conventionally drive a display device such as a cathode ray tube (CRT) 88. A switching power supply (PS) 90 receives and converts an AC voltage and provides a set of converted, regulated voltages to the horizontal synch circuit 85 for various operations.

The display system 80 may be such as is found in a computer terminal, workstation, portable processor, or CTV system.

Figure 6:
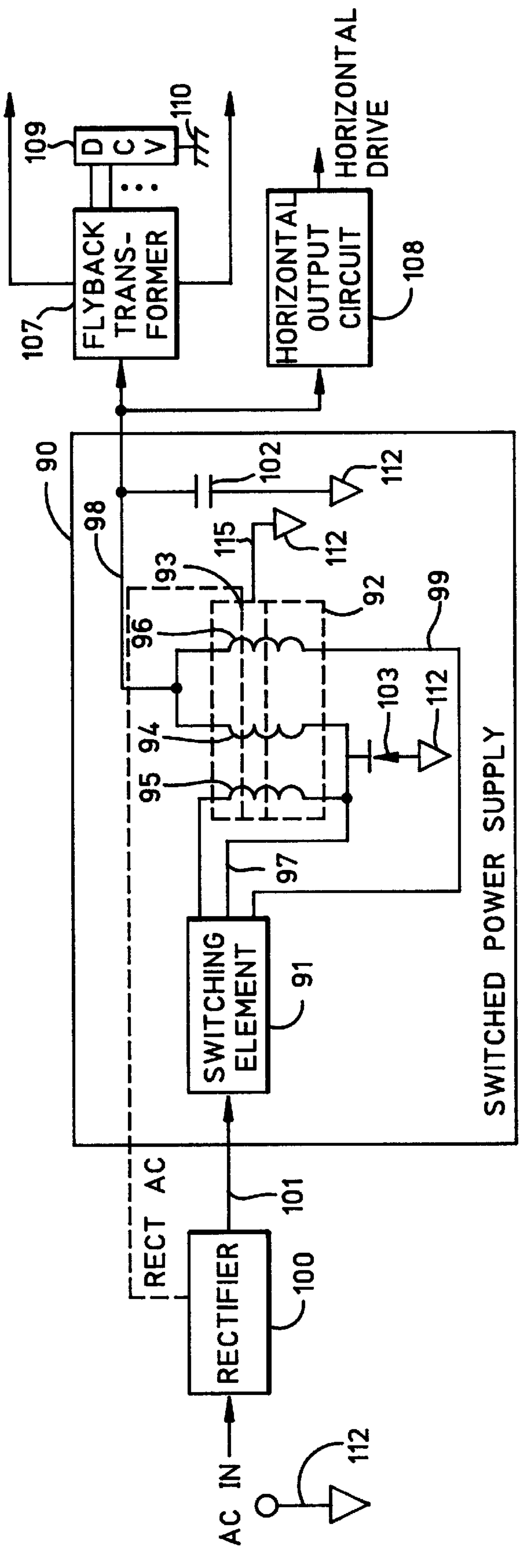
FIG. 6 is a block diagram showing a switched power supply that provides power to the horizontal synch component of the CTV system of FIG. 5 and that includes a transformer with a short ring according to this invention.

In FIG. 6, the switched power supply 90 is fed by an unregulated, rectified AC voltage produced at 101 by a rectifier circuit 100 in response to an input AC voltage. In the switched power supply 90, the rectified AC voltage is received by a switching element 91 that is connected to a multi-winding switching transformer 92 that includes a short ring 93. The switching transformer 92 includes three windings, a first (P) winding 94 that is wound with one polarity, a second (D) winding 95 and a third (d) winding 96, both of which are wound opposite in polarity to the P winding 94. When the rectified AC voltage is provided to the switching element 91, the switching element 91, in a first state provides a drive signal in the form of a current on signal path 97 that starts to flow through the P winding 94 of the switching transformer 92. At the same time, the P winding 94 applies power to a load on signal path 98 and stores energy. In response to the storage of energy in the P winding 94, voltage is induced in the D winding 95 and the d winding 96 of the switching transformer 92. Current induced by the voltage in the d winding 96 of the switching transformer 92 flows back to the switching element 91 on signal path 99. After a period of time, the current on the signal path 99 changes the switching element 91 to a second state in which the current provided to the P winding 94 on the signal path 97 is turned off. Now, the energy stored in the P winding 94 discharges into the load on signal path 98 through the capacitor 102 and diode 103. At this time, a negative voltage is induced in the D winding 95, which keeps the switching element 91 in the second state. Once the energy stored in the D winding 95 is discharged, the switching element 91 returns to the first state, repeating the process.

The switched power supply 90 provides a converted, regulated voltage on the signal path 98 to a load that includes a flyback transformer 107 and a horizontal output circuit 108. The horizontal output circuit 108 produces a horizontal drive signal that is provided as HDEF to the CRT 88 of FIG. 5. The output of flyback transformer 107 is provided to a DC voltage (DCV) converter 109 that provides a variety of DC voltages for the operations of the horizontal synch circuit 85. The operations of the switched power supply 90 are referenced to an AC ground 112. The DC voltages produced by the operations of 107, 109 are referenced to a DC ground 110. The AC ground 112 may be termed a "hot" ground, while the DC 110 may be termed a "cold" ground. The invention is incorporated into the switched power supply 90 by providing the short ring 93 with an electrically conductive discharge path 115 to the "hot" ground 112. The electrically conductive discharge path 115 may have any one of the forms shown above in FIGS. 1, 2, 3, and 4A–4C. That is, the discharge path 115 may, or may not, include a capacitative element. Instead of the hot ground 112, the inventor has determined that the electrically conductive discharge path 115 may be connected to the unregulated, rectified AC voltage that drives the switching element 91. In this case, the electrically conductive discharge element 115 would include a capacitative element. Although not shown in FIG. 6, it is contemplated that the switching transformer 92 may include a Faraday shield. In this case, the Faraday shield may be connected to the predetermined potential to which the short ring 93 is connected. That is the Faraday shield may be connected as illustrated above either to the hot ground 112 or the rectified AC voltage.

With reference to FIGS. 5 and 6, use of the invention in a display system such as a CTV system to discharge the short ring 93 and/or the switching transformer 92 to the hot ground 112, has provided an unexpected result. That is, the inventor has observed that provision of the electrically conductive discharge pathway from the short ring 93 to the hot ground 112 greatly reduces horizontal jitter produced on the CRT 88.

Many modifications and variations of the invention will be evident to those skilled in the art. It is understood that such variations may deviate from specific teachings of this description without departing from the essence of the invention, which is expressed in the following claims.

I claim:

1. A transformer, comprising:

a plurality of windings;

at least one short ring on the transformer, outside of the windings; and a lead with a first end connected to the at least one short ring and a second end for being connected to a potential.

2. The transformer of claim 1, wherein the potential is an AC ground.

3. The transformer of claim 1, wherein the potential is a rectified AC voltage.

4. The transformer of claim 1, further including a capacitative element connected to the second end of the lead.

5. The transformer of claim 4, wherein the potential is an AC ground.

6. The transformer of claim 4, wherein the potential is a rectified AC voltage.

7. The transformer of claim 1, further including:

at least one Faraday shield; and a lead with a first end connected to the at least one Faraday shield and a second end for being connected to the potential.

8. The transformer of claim 7, wherein the potential is an AC ground.

9. The transformer of claim 7, wherein the potential is a rectified AC voltage.

10. The transformer of claim 7, further including:

a first capacitative element connected to the second end of the lead connected to the at least one short ring; and a second capacitative element connected to the second end of the lead connected to the at least one Faraday shield.

11. The transformer of claim 10, wherein the potential is an AC ground.

12. The transformer of claim 10, wherein the potential is a rectified AC voltage.

13. The transformer of claim 1, further including:

at least one Faraday shield electrically connected to the lead.

14. The transformer of claim 13, wherein the potential is an AC ground.

15. The transformer of claim 13, wherein the potential is a rectified AC voltage.

16. The transformer of claim 13, further including a capacitative element connected to the second end of the lead.

17. A transformer, comprising:

a plurality of windings;

at least one short ring on the transformer, outside of the windings; and an electrically conductive discharge path connected to the at least one short ring.

18. The transformer of claim 17, wherein the electrically conductive discharge path includes a capacitative element.

19. The transformer of claim 17, further including:

at least one Faraday shield; and an electrically conductive discharge path connected to the at least one Faraday shield.

20. The transformer of claim 17, wherein:

the electrically conductive discharge path connected to the at least one short ring includes a capacitative element; and the electrically conductive discharge path connected to the at least one Faraday shield includes a capacitative element.

21. The transformer of claim 17, further including:

at least one Faraday shield connected to the electrically conductive discharge path.

22. The transformer of claim 21, wherein the electrically conductive discharge path includes a capacitative element.

23. A power supply, comprising:

an element, responsive to an unregulated input voltage referenced to a predetermined potential for providing a drive signal;

a multi-winding switching transformer connected to the element for producing a regulated voltage in response to the drive signal;

at least one short ring that girds the switching transformer, outside of the windings; and an electrically conductive discharge path connected to the at least one short ring and to the predetermined potential.

24. The power supply of claim 23, wherein the electrically conductive discharge path includes a capacitative element.

25. The power supply of claim 23, wherein the predetermined potential is AC ground.

26. The power supply of claim 23, wherein the predetermined potential is the unregulated input voltage.

27. The power supply of claim 23, wherein the electrically conductive discharge path includes a lead with the first end connected to the at least one short ring and a second end connected to the predetermined potential.

28. The power supply of claim 27, further including a capacitative element connected to the second end of the lead.

29. The power supply of claim 28, wherein the potential is AC ground.

30. The power supply of claim 28, wherein the potential is the unregulated input voltage.

31. The power supply of claim 23, further including:

at least one Faraday shield in the switching transformer; and an electrically conductive discharge path connected to the at least one Faraday shield and to the predetermined potential.

32. The power supply of claim 31, wherein:

the electrically conductive discharge path connected to the at least one short ring includes a capacitative element; and the electrically conductive discharge path connected to the at least one Faraday shield includes a capacitative element.

33. The transformer of claim 23, further including:

at least one Faraday shield in the switching transformer that is connected to the electrically conductive discharge path.

34. The transformer of claim 33, wherein the electrically conductive discharge path includes a capacitative element.

35. A display system, comprising:

a display device;

a horizontal synch circuit connected to the display device for providing a horizontal display control signal in response to a regulated voltage; and a power supply having an element responsive to an unregulated input voltage referenced to a predetermined potential for providing a drive signal, and further including:

a multi-winding switching transformer connected to the element for producing the regulated voltage in response to the drive signal;

at least one short ring that girds the switching transformer, outside of the windings; and an electrically conductive discharge path connected to the at least one short ring and to the predetermined potential.

36. The display system of claim 35, wherein the electrically conductive discharge path includes a capacitative element.

37. The display system of claim 35, wherein the predetermined potential is AC ground.

38. The display system of claim 35, wherein the predetermined potential is the unregulated input voltage.

39. The display system of claim 35, wherein the electrically conductive discharge path includes a lead with a first end connected to the at least one short ring and a second end connected to the predetermined potential.

40. The display system of claim 39, further including a capacitative element connected to the second end of the lead.

41. The display system of claim 40, wherein the potential is AC ground.

42. The display system of claim 40, wherein the potential is the unregulated input voltage.

43. The display system of claim 35, further including:

at least one Faraday shield in the switching transformer; and an electrically conductive discharge path connected to the at least one Faraday shield and to the predetermined potential.

44. The display system of claim 43, wherein:

the electrically conductive discharge path connected to the at least one short ring includes a capacitative element; and the electrically conductive discharge path connected to the at least one Faraday shield includes a capacitative element.

45. The display system of claim 35, further including:

at least one Faraday shield in the switching transformer that is connected to the electrically conductive discharge path.

46. The display system of claim 45, wherein the electrically conductive discharge path includes a capacitative element.

47. The display system of claim 35, wherein the display system is a television system.

* * * * *